(12) United States Patent
Mukherjee

(10) Patent No.: US 11,783,220 B1
(45) Date of Patent: Oct. 10, 2023

(54) QUANTUM DYNAMIC NETWORK SEVER LOAD MANAGEMENT SYSTEM

(71) Applicant: BANK OF AMERICA CORPORATION, Charlotte, NC (US)

(72) Inventor: Maharaj Mukherjee, Poughkeepsie, NY (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 69 days.

(21) Appl. No.: 17/704,310

(22) Filed: Mar. 25, 2022

(51) Int. Cl.
*G06N 10/80* (2022.01)
*H04L 67/1008* (2022.01)
*H04L 67/101* (2022.01)

(52) U.S. Cl.
CPC ........... *G06N 10/80* (2022.01); *H04L 67/101* (2013.01); *H04L 67/1008* (2013.01)

(58) Field of Classification Search
CPC .... G06N 10/80; H04L 67/1008; H04L 67/101
See application file for complete search history.

(56) References Cited

U.S. PATENT DOCUMENTS

| | | | |
|---|---|---|---|
| 6,697,368 B2 | 2/2004 | Chang et al. | |
| 7,254,626 B1 | 8/2007 | Kommula et al. | |
| 7,257,642 B1 | 8/2007 | Bridger et al. | |
| 7,584,301 B1 | 9/2009 | Joshi | |
| 7,657,629 B1 | 2/2010 | Kommula | |
| 7,949,757 B2 | 5/2011 | Joshi | |
| 8,238,344 B1 | 8/2012 | Chen et al. | |
| 8,248,928 B1 | 8/2012 | Wang et al. | |
| 8,537,697 B2 | 9/2013 | Leong et al. | |
| 8,812,904 B2 | 8/2014 | Kamath et al. | |
| 8,949,410 B2 | 2/2015 | Patel et al. | |
| 9,137,165 B2 | 9/2015 | Anand et al. | |
| 9,207,672 B2 * | 12/2015 | Williams | G06N 10/00 |
| 9,270,566 B2 | 2/2016 | Wang et al. | |
| 9,400,499 B2 * | 7/2016 | Williams | G06F 1/20 |
| 2005/0033858 A1 | 2/2005 | Swildens et al. | |
| 2008/0195731 A1 | 8/2008 | Harmel et al. | |
| 2008/0304423 A1 | 12/2008 | Chuang et al. | |

(Continued)

FOREIGN PATENT DOCUMENTS

WO    WO-2022254359 A1 * 12/2022

*Primary Examiner* — Suraj M Joshi
(74) *Attorney, Agent, or Firm* — Moore & Van Allen PLLC; Nicholas C. Russell

(57) ABSTRACT

Embodiments of the present invention provide a system for using quantum optimization to provide a real time network server load or capacity management system for dynamic update and resource allocation and outage prevention. Load management information is received from a plurality of information technology infrastructure devices (e.g., servers, network devices, storage systems, and end user devices) that make up an overall system network environment. When at least a portion of that load management information is too burdensome for a conventional computer apparatus, the information is formatted for quantum optimization and transmitted to a quantum optimizer. The quantum optimizer analyzes the data and responds with an optimized load leveling or load balancing process for distributing traffic across the information technology infrastructure devices. This optimized load leveling process is then implemented across the appropriate devices.

20 Claims, 4 Drawing Sheets

(56) References Cited

U.S. PATENT DOCUMENTS

| | | |
|---|---|---|
| 2013/0259037 A1 | 10/2013 | Natarajan et al. |
| 2014/0029451 A1 | 1/2014 | Nguyen |
| 2015/0180802 A1 | 6/2015 | Chen et al. |
| 2015/0215841 A1 | 7/2015 | Hsu et al. |
| 2021/0208943 A1 | 7/2021 | Baughman et al. |

* cited by examiner

QUANTUM DYNAMIC NETWORK SEVER LOAD MANAGEMENT SYSTEM

FIELD

In general, embodiments of the invention relate to identifying and modifying server loads in real-time through the use of quantum computing, and more particularly, methods, devices, and computer program products for implementing a quantum dynamic server load management system that leverages the optimization advantages of a quantum device.

BACKGROUND

Typical administration of network server load distribution, particularly at times of peak load volume, tends to focus on capacity management at individual points in a network. This can lead to the overload of individual network servers, leading to additional failure points for the wider network. Current computing systems are not capable of providing real time dynamic optimization for capacity managers in load levelers. Quantum computing algorithms and techniques can be used to solve optimization problems through the use of minimization analysis to identify an optimal solution comprising minimal error.

Therefore, a need exists to provide a quantum dynamic network server load management system to optimally (or near-optimally) manage capacity levels of network servers on a global level, including the detection of server capacity trends across networks to identify potential future failure points and provide real time modifications to load distributions and allocations across entire networks.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for quantum dynamic network server load management. The system embodiments may comprise a classical computer apparatus with a processor, a memory, and a network server load management application that is stored in the memory and executable by the processor. Furthermore, the system embodiments may comprise a quantum optimizer in operative communication with the classical computer apparatus, where the quantum optimizer comprises a quantum processor and a quantum memory. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

For sample, illustrative purposes, system environments will be summarized. The system may involve receiving, via a classical computer apparatus, load management information from a plurality of information technology infrastructure devices of an overall system network environment. The system may then determine, via the classical computer apparatus, that at least a subset of the load management information requires quantum optimization. In response to determining that the subset of the load management information requires quantum optimization, the system can format, via the classical computer apparatus, the subset of the load management information for quantum optimization. Next, the system may transmit, via the classical computer apparatus, the formatted subset of the load management information to the quantum optimizer.

The quantum optimizer will then receive the transmitted formatted subset of the load management information from the classical computer apparatus. The quantum optimizer of the system can then analyze the formatted subset of the load management information to determine the optimized load leveling process for distributing traffic across the information technology infrastructure devices.

In some embodiments, the quantum optimizer then transmits the optimized load leveling process for distributing traffic across the information technology infrastructure devices to the classical computer apparatus.

The system may then receive, via the classical computer apparatus, from the quantum optimizer, an optimized load leveling process for distributing traffic across the information technology infrastructure devices based on the formatted subset of the load management information. Finally, the system can implement, via the classical computer apparatus, the optimized load leveling process across the information technology infrastructure devices of the overall system network environment.

In some embodiments, the step of receiving the load management information from the plurality of information technology infrastructure devices comprises dynamically receiving the load management information in real time from each of the plurality of network servers.

The server capacity management application of the classical apparatus may, in some embodiments, receive an indication that a change management process of the overall system network environment will go into effect within a predetermined period of time. In such embodiments, the step of transmitting the formatted subset of load management information to the quantum optimizer is performed in response to receiving the indication that the change management process will go into effect within the predetermined period of time.

The subset of load management information may be data that cannot be efficiently processed by the classical computer apparatus alone, based on complexity or quantity of metrics in the load management information.

The information technology infrastructure devices of this system can comprise a plurality of servers, network devices, storage systems, end user devices, or the like.

The load management information may comprise, in some embodiments, server volume information, device latency information, hardware operation metrics, software operation metrics, memory levels, and physical space levels of the information technology infrastructure devices. Additionally or alternatively, the load management information may comprise efficiency metrics for processed data across the information technology infrastructure devices.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
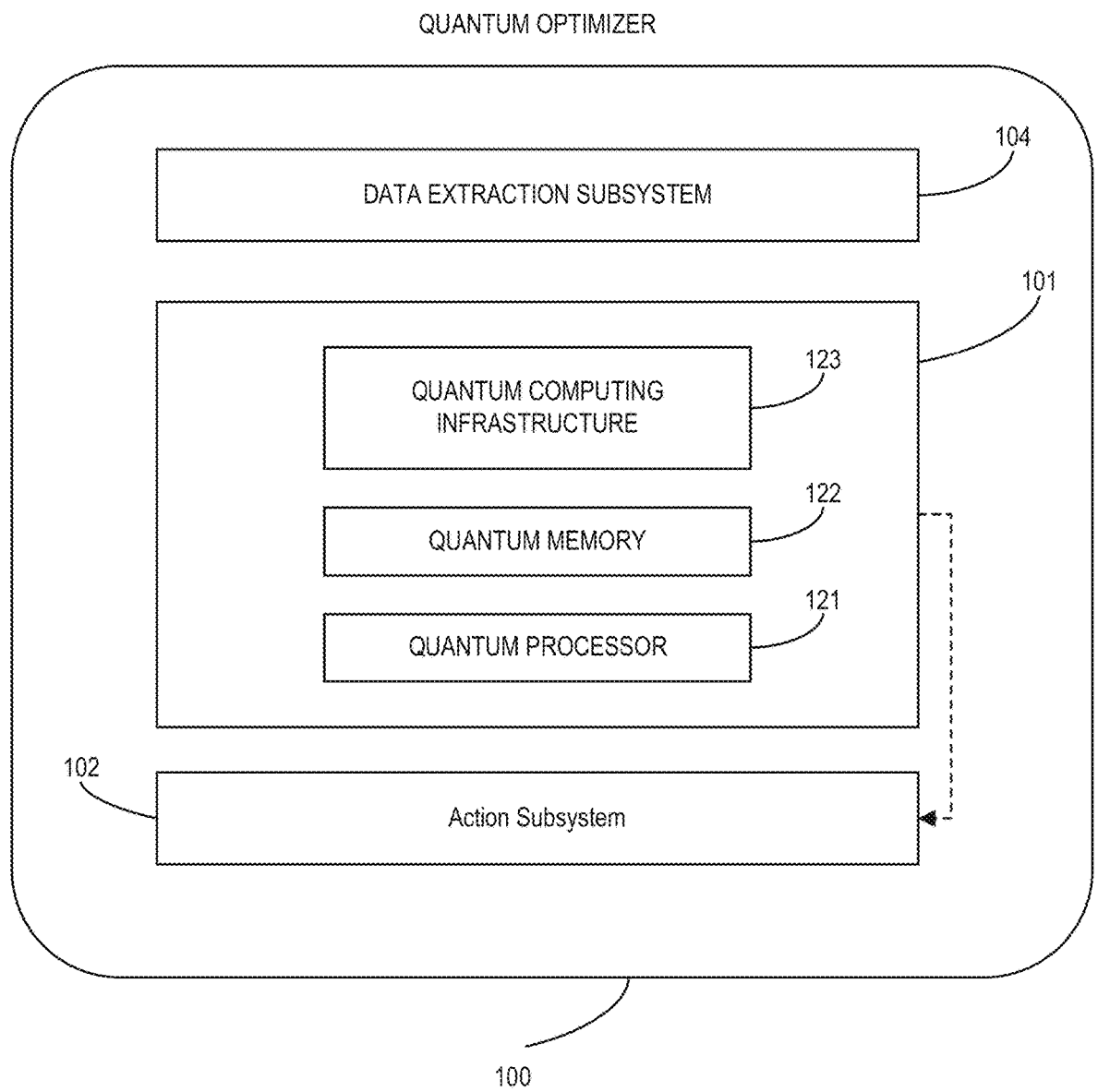
Figure 2:
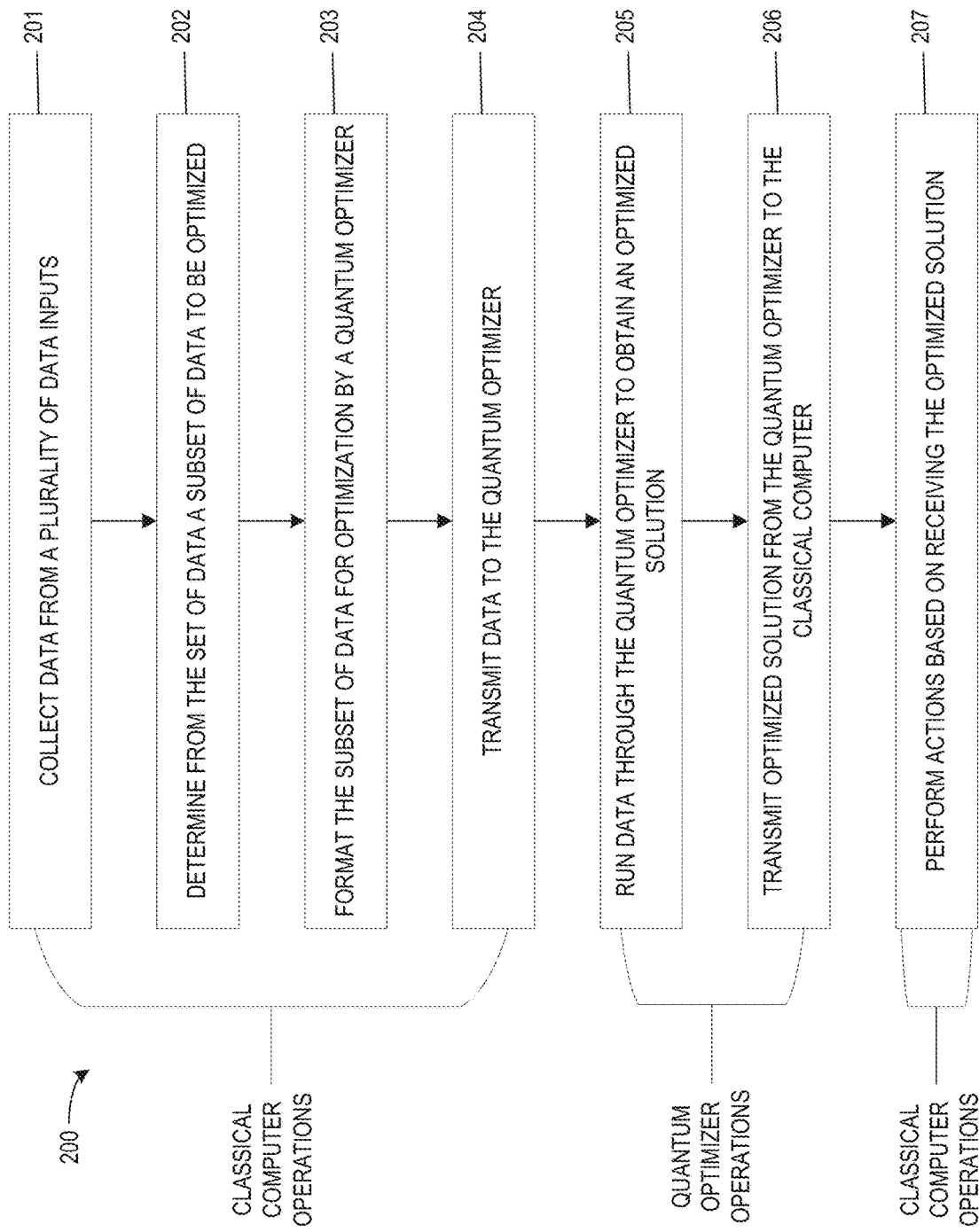
Figure 3:
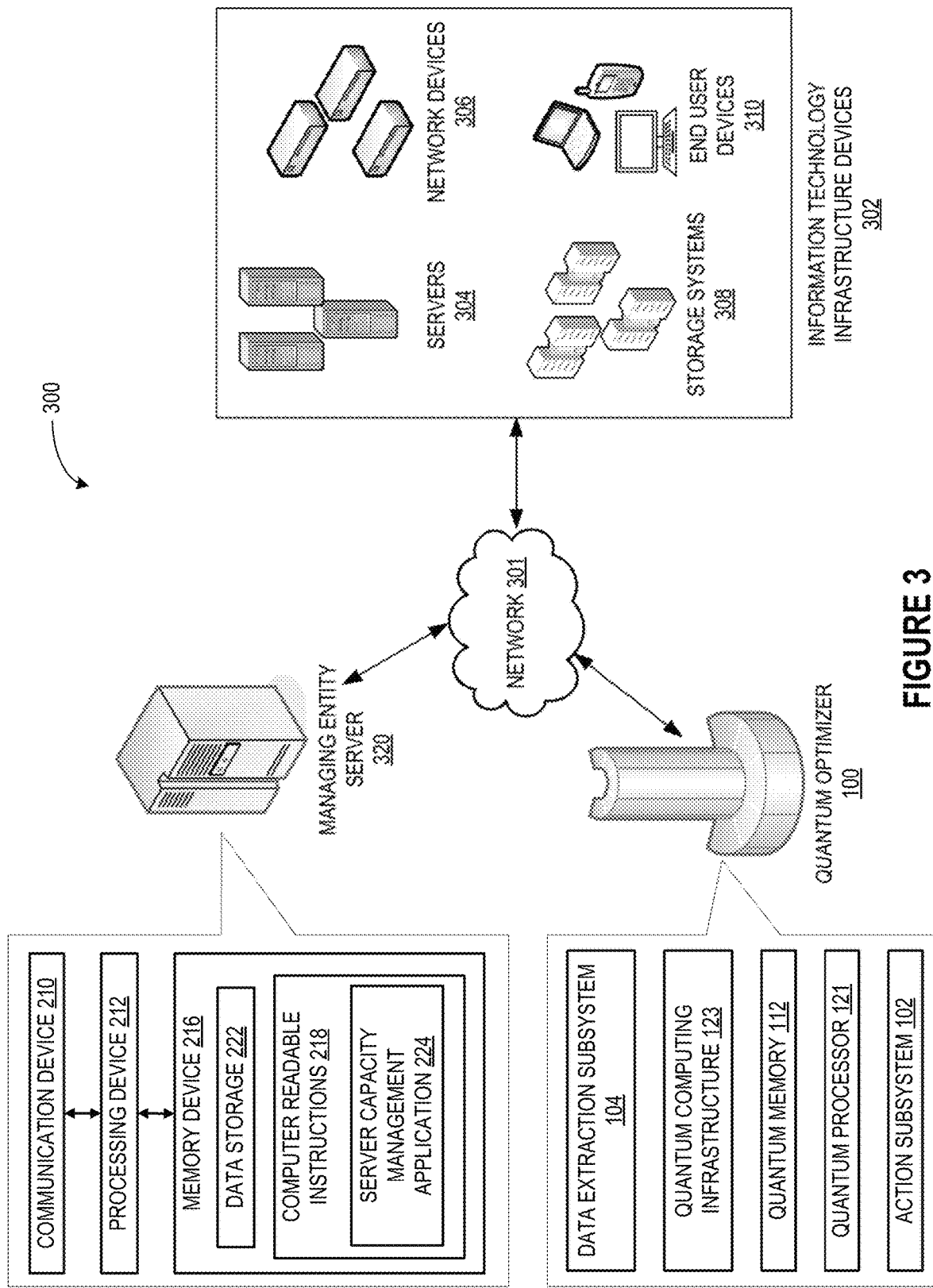
Figure 4:
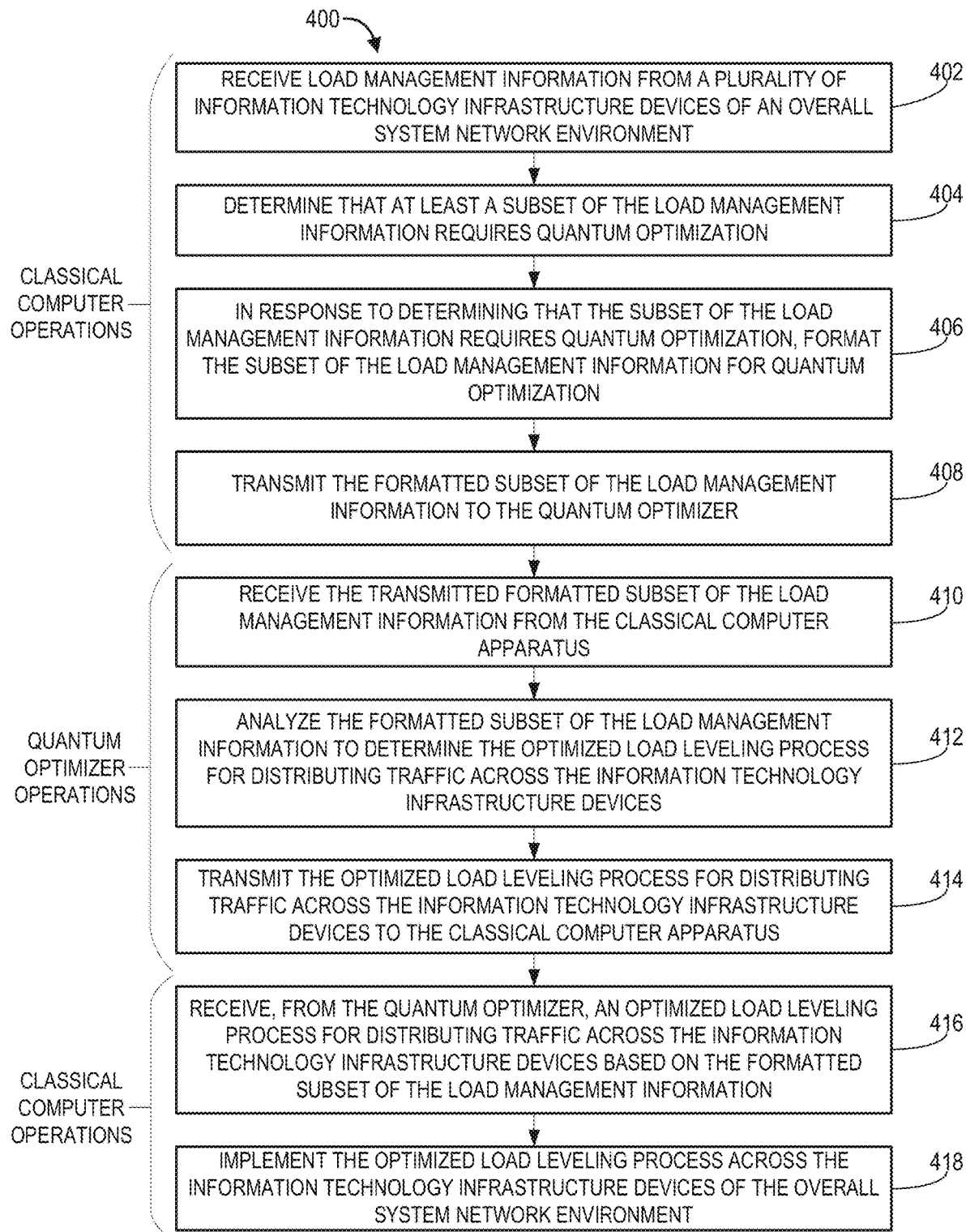

Having thus described embodiments of the invention in general terms, reference will now be made the accompanying drawings, wherein:

FIG. 1 provides a block diagram illustrating a quantum optimizer, in accordance with embodiments of the invention;

FIG. 2 provides a high level process flow of a system for executing an optimized solution using a quantum optimizer, in accordance with embodiments of the invention;

FIG. 3 provides a block diagram illustrating a system environment for providing a quantum dynamic server load management system, in accordance with embodiments of the invention; and FIG. 4 provides a flowchart illustrating a process for providing a quantum dynamic server load management system, in accordance with an embodiment of the invention.

DETAILED DESCRIPTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

Embodiments of the present invention provide a system and method for quantum dynamic network server load management. The system receives a large amount of load management information from its plurality of devices within the information technology infrastructure. As the system will need to quickly determine how to redirect traffic across the devices to prevent bottlenecks, slow-downs, or outages for the devices, the system can identify at least a set of the load management information that needs to be processed by a quantum optimizer to meet the time and accuracy requirements of a load management system. In such instances, load management or load balancing systems that run on conventional computer apparatuses are not adequate to make the determinations in a fast enough time (with enough accuracy) to resolve load leveling issues on a large (e.g., global) scale.

To accomplish these goals, embodiments of the present invention leverage the capabilities of quantum computing to analyze formatted load management information and determine an optimized load leveling process for distributing traffic across information technology infrastructure devices in real-time or near real-time.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to 2n states simultaneously. By comparison, a classical computer can only be in one of the 2n states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

FIG. 1 is a schematic diagram of an exemplary quantum optimizer 100 that can be used in parallel with a classical computer to solve optimization problems. The quantum optimizer 100 is comprised of a data extraction subsystem 104, a quantum computing subsystem 101, and an action subsystem 105. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 1, the data extraction subsystem 104 communicates with the network to extract data for optimization. It will be understood that any method of communication between the data extraction subsystem 104 and the network is appropriate, including but not limited to wired communication, Radiofrequency (RF) communication, Bluetooth WiFi, and the like. The data extraction subsystem 104 then formats the data for optimization in the quantum computing subsystem.

As further depicted in FIG. 1, the quantum computing subsystem 101 comprises a quantum computing infrastructure 123, a quantum memory 122, and a quantum processor 121. The quantum computing infrastructure 123 comprises physical components for housing the quantum processor 121 and the quantum memory 122. The quantum computing infrastructure 123 may further comprise a cryogenic refrigeration system to keep the quantum computing subsystem 101 at the desired operating heat and cooling levels. In general, the quantum processor 121 is designed to perform adiabatic quantum computation and/or quantum annealing to optimize data received from the data extraction subsystem 104. However, any quantum system capable of performing optimization problems may be used. The quantum memory 122 is comprised of a plurality of qubits used for storing data during operation of the quantum computing subsystem 101. In general, qubits are any two-state quantum mechanical system. It will be understood that the quantum memory 122 may be comprised of any such two-state quantum mechanical system, such as the polarization of a single photon, the spin of an electron, and the like.

The action subsystem 102 communicates the optimized data from the quantum computing subsystem 101 over the network. It will be understood that any method of communication between the data extraction subsystem 104 and the network is appropriate, including but not limited to wired communication, Radiofrequency (RF) communication, Bluetooth Wi-Fi, and the like.

FIG. 2 is a high level process flow 200 of an embodiment of the present invention. As depicted in FIG. 2, a classical computer begins the process at step 201 by collecting data from a plurality of inputs. The input(s) may be, for example, information technology infrastructure devices. As used herein, information technology infrastructure devices may be any plurality of servers, network devices, storage systems, or end user devices. Examples of servers may be application servers, virtual machine servers, transaction servers, monitoring and management servers, mail servers, web proxy servers, database servers, file transfer protocol (FTP) servers, domain name system (DNS) servers, file servers, dynamic host configuration protocol (DHCP) servers, and the like. Examples of network devices may comprise hubs, switches, routers, bridges, gateways, modems, access points, and the like. Storage systems may be any databases, data lakes, file systems, archive systems, and the like. The end user devices may be any computing device that access, processes (or requests the processing of) data through the information technology infrastructure, or the like.

At step 202, the classical computer of the system then determines from the set of data collected at step 201 a subset a data to be optimized. In some embodiments of the invention, not all data collected at step 201 is necessary for optimization. In some embodiments, the system may receive data from a plurality of information technology infrastructure devices, which may include server devices, network devices, storage systems, end user devices, and the like. The system may determine that data received from one or more types of these information technology infrastructure devices (e.g., server devices) needs to be sent to the quantum optimizer, while data from other devices may not. This could be because certain data obtained from the former devices requires parsing large sets of data representing trends over a long period of time for many server devices, which would be unrealistic or impossible to perform on a classical computer. The system can determine that the quantum optimizer will be able to perform this search in real-time or near real-time. It should be understood that the above example is offered only for purposes of explanation. In some embodiments, the system may determine that all of the data received from the information technology infrastructure devices should be optimized.

At step 203, the classical computer then formats the subset of data it has determined should be optimized. As noted above, the quantum optimizer is designed to solve optimization problems in real-time or near real-time. An optimization problem as used herein refers to a problem of finding the best solution of a set of all known solutions. Thus, formatting the data sent to the quantum optimizer involves organizing the data such that the quantum optimizer can recognize the data as an optimization problem.

With regard to step 204, the classical computer transmits the formatted subset of data to the quantum optimizer. Transmission may be any suitable method for communicating data to the data extraction subsystem 104. For example, the classical computer and the quantum optimizer may be connected by a wired transmission line, if they are in close proximity to one another. In other embodiments, the quantum optimizer and/or the classical computer may be off-site, and some method of wireless communication may be preferred.

At step 205, the quantum optimizer runs the formatted data it has received from the classical computer to obtain the optimized result. As noted, the quantum optimizer is configured to solve optimization problems. Thus, the quantum optimizer may obtain an optimized result through quantum annealing or adiabatic expansion, or by executing a suitable quantum optimization algorithm.

After the optimized result has been obtained, the quantum optimizer then transmits the result back to the classical computer at step 206. In some embodiments, transmission back to the classical computer may be over the same transmission line as was used to send the formatted data to the quantum optimizer. In other embodiments, a different transmission line may be used to transmit the optimized result back to the classical computer.

Finally, at step 207, the classical computer may perform actions based on the optimized result. In some embodiments, this action may be to implement a received load leveling process to direct or distribute traffic across the information technology infrastructure devices. In other embodiments, the optimized result that was output from the quantum optimizer may be a component of information that the classical computer can combine with other load leveling or load balancing information to determine the load leveling processing to implement across the information technology infrastructure devices to appropriately manage traffic across the devices and prevent undesired surges and outages.

FIG. 3 is an exemplary environment in which embodiments of the present invention may be implemented. As depicted in FIG. 3, the system environment 300 includes a plurality of information technology infrastructure devices 302. These information technology infrastructure devices 302 may comprise devices that are spread out across a large, even global, enterprise network, but that are owned, or at least managed (at some level), by an entity (i.e., a managing entity).

The information technology infrastructure devices 302 may comprise a plurality of servers 304, network devices 306, storage systems 308, and end user devices 310. Examples of servers 304 can include application servers, virtual machine servers, transaction servers, monitoring and management servers, mail servers, web proxy servers, database servers, file transfer protocol (FTP) servers, domain name system (DNS) servers, file servers, dynamic host configuration protocol (DHCP) servers, and the like.

Examples of network devices 306 may comprise hubs, switches, routers, bridges, gateways, modems, access points, and the like. Storage systems 308 may be any databases, data lakes, file systems, archive systems, and the like. The end user devices 310 may be any computing device that access, processes (or requests the processing of) data through the information technology infrastructure, or the like.

Each of these information technology infrastructure devices 302 may process information, is otherwise involved in requesting the processing of information or data, transmitting information or data, receiving processed information or data, or the like. When dealing with very large system network environments, the information technology infrastructure devices 302 can at times be set up to receive more data or information that that device can appropriately process or transmit in a desired amount of time. In such instances, these devices can either become slow or can shut down or otherwise become incapable of processing information at all. Load leveling systems (or load balancing systems) manage the flow of data and information across these devices to help reduce the flow to certain devices when they are nearing capacity (or to otherwise optimize the active devices on the network).

To accomplish this management task, certain types of information can be obtained from the individual information technology infrastructure devices 302 (or combinations of devices/networks). For example, these information technology infrastructure devices 302 can have information relating to data volumes being processed, speeds of processing, latencies in processing data, overall efficiency of the movement of data as it is processed by the devices, operations of the hardware and software components of the devices, memory statistics, physical space metrics, and other performance metrics. This information can also include trends of one or more (or a combination) of any of the foregoing. All of this information can be considered "load management information" that can be used to identify which devices are being or will be stressed, reaching processing capacity, or are otherwise near a state in which they will not be able to appropriately process data and information in their intended manner.

A managing entity server 320 (which may in some embodiments comprise one of the servers 304) can be used as part of the system to manage the traffic flow of information across the information technology infrastructure devices 302. The managing entity server 320 includes a communication device 210, a processing device 212, and a memory device 216. The memory device 216 includes a data storage 222 and computer readable instructions 218. The computer readable instructions 218 may include a server capacity management application 224 that is configured to receive information from the information technology infrastructure devices 302, perform certain analytical processes to the information, transform at least a portion of the information into a format that can be utilized by the quantum optimizer 100, and communicate with the quantum optimizer 100 across the network 301 to perform one or more of the tasks described herein.

The communication device 210 allows the managing entity server 320 to communicate with the information technology infrastructure devices 302 and the quantum optimizer 100. It should be understood that the communication device 210 may be one or more communication devices so that the financial institution can communicate over different channels with different devices.

Referring now to FIG. 4, a flowchart is provided to illustrate one embodiment of a process 400 for providing quantum dynamic network server load management, in accordance with embodiments of the invention. In some embodiments, the process 400 may include block 402, where the system receives, via a classical computer apparatus, load management information from a plurality of information technology infrastructure devices of an overall system network environment.

The information technology infrastructure devices may comprise a plurality of servers, network devices, storage systems, or end user devices. Examples of servers may be application servers, virtual machine servers, transaction servers, monitoring and management servers, mail servers, web proxy servers, database servers, file transfer protocol (FTP) servers, domain name system (DNS) servers, file servers, dynamic host configuration protocol (DHCP) servers, and the like. Examples of network devices may comprise hubs, switches, routers, bridges, gateways, modems, access points, and the like. Storage systems may be any databases, data lakes, file systems, archive systems, and the like. The end user devices may be any computing device that access, processes (or requests the processing of) data through the information technology infrastructure, or the like.

The load management information may comprise server volume information, device latency information, hardware operation metrics, software operation metrics, memory levels, and physical space levels of the information technology infrastructure devices, or the like. Additionally or alternatively, the load management information may comprise efficiency metrics for processed data across the information technology infrastructure devices.

Receiving the load management information from the plurality of information technology infrastructure devices can comprise dynamically receiving the load management information in real time from each of the plurality of network servers.

In some embodiments, the process 400 includes block 404, where the system determines, via the classical computer apparatus, that at least a subset of the load management information requires quantum optimization.

In some embodiments, the subset of load management information comprises data that cannot be efficiently processed by the classical computer apparatus alone, based on complexity or quantity of metrics in the load management information. Timing is of the essence when dealing with load balancing of important devices like transaction servers and some application servers. As such, if conventional computing devices are not able to process the large amounts of load management data in a very short period of time, while still achieving accurate and optimized load balancing solutions, then the conventional computing devices are effectively not capable of addressing the load leveling issues. This can cause bottlenecks, slow-downs, and outages of important servers or other devices that can have a negative effect on a managing entity. As such, the use of quantum optimizers to solve these types of complex optimization problems is a necessary requirement when analyzing very large volumes of data in a short period of time to manage important network devices.

The system may perform one or more "quantum optimizer suitability tests" to make these determinations for at least portions of the received load management information, where the quantum optimizer suitability test is performed as the load management information is received from the information technology infrastructure devices of the system network environment and before the system begins analyzing the load management information by conventional means-alone.

Additionally or alternatively, the system may be configured to detect a data type of the received load management information, where one or more known data types are associated with data that is suitable for quantum optimization. In such embodiments, the system may automatically label the received load management information of one of these particular data types as being suitable for quantum optimization upon receiving the data. For example, data traffic volumes and processing efficiency trends of multiple different servers spread out across the system network environment is inherently data intensive, so the system may determine that any such data will automatically be labeled as suitable for quantum optimization. Likewise, the system may determine that any data with a certain format, structure, file name extension, and the like, may be inherently or at least likely to be suitable for quantum optimization. As such, the system may automatically label, tag, or otherwise denote the received load management information or data of the certain format, structure, and/or file name extension as suitable for quantum optimization.

Additionally, in some embodiments, the process 400 includes block 406, where, in response to determining that the subset of the load management information requires quantum optimization, the system formats, via the classical computer apparatus, the subset of the load management information for quantum optimization. In this way, the classical computer of the system transforms the load management information into a format that the quantum optimizer can receive and analyze.

The process 400 may also include block 408, where the system transmits, via the classical computer apparatus, the formatted subset of the load management information to the quantum optimizer.

This process 400 can, in some instances, run on an ongoing basis to monitor and balance server loads or other information technology infrastructure devices. However, in some embodiments, the system may use the quantum optimizer in response to a triggering event or a surge event. For example, as change management processes can often adjust the flow of data and information across information technology infrastructure devices, the system can receive change management process information. The system can then determine a time that a new change management protocol will go into effect and begin using the quantum optimizer before the new change management protocol goes into effect, thereby using a load leveling system that is capable of managing a significant change to a large (e.g., global) infrastructure, when conventional computing apparatuses are not capable of doing the same.

As such, the system may receive an indication that a change management process of the overall system network environment will go into effect within a predetermined period of time. In response to receiving the indication that the change management process will go into effect within the predetermined period of time, the system can transmit the formatted subset of load management information to the quantum optimizer is performed.

Additionally or alternatively, the system may determine, based on daily, weekly, or annual trends, that a larger-than-normal processing load is likely to be present for at least a portion of the information technology infrastructure devices (e.g., transaction servers on a day that many individuals are expected to place transactions). As with the change management process, the system can preempt such surges by using the quantum optimizer to handle the complex analytical optimization problem for distributing the flow of information in real time before or during such an event.

In some embodiments, the process 400 includes block 410, where the system receives, via a quantum optimizer, the transmitted formatted subset of the load management information from the classical computer apparatus. As described above, the received formatted load management information may require complex algorithms to analyze, or may be highly resource intensive (e.g., prohibitively high, so as to require more processing time via a conventional computer apparatus). Therefore, the quantum optimizer may be specially configured to automatically perform the complex algorithms or resource intensive analysis required to analyze the load management information and data in real-time or substantially in real-time. As such, the quantum optimizer may be a specialized quantum computing device that is specifically designed to receive the formatted load management information data as input, perform the appropriate analysis of the formatted load management information and data, and publish or otherwise transmit a result of the analysis back to conventional computer apparatuses.

Additionally, in some embodiments, the process 400 includes block 412, where the system analyzes, via the quantum optimizer, the formatted subset of the load management information to determine the optimized load leveling process for distributing traffic across the information technology infrastructure devices.

The process 400 may include block 414, where the system transmits, via the quantum optimizer, the optimized load leveling process for distributing traffic across the information technology infrastructure devices to the classical computer apparatus.

Furthermore, the process 400 may include block 416, where the system receives, via the classical computer apparatus, from the quantum optimizer, an optimized load leveling process for distributing traffic across the information technology infrastructure devices based on the formatted subset of the load management information.

Finally, the process 400 may continue to block 418, where the system implements, via the classical computer apparatus, the optimized load leveling process across the information technology infrastructure devices of the overall system network environment.

In alternative embodiments, the output of the quantum optimizer is fed into a conventional load leveler or load balancer system, as a component of a larger dataset that the conventional load leveler system will then use to determine the appropriate load leveling process to implement across the information technology infrastructure devices. In such an example, the conventional system would not be able to process a certain type of data in an efficient (i.e., real time or near real time) manner while also obtaining an optimum or near-optimum result, and instead relies on the faster and accurate calculations made by the quantum optimizer.

By utilizing the quantum optimizer to perform resource-intensive computations, the system will determine optimum load leveling solutions in real time with a higher degree of confidence than through using conventional load leveling methods that only require computational resources that can be done in real-time by a classical computer apparatus. Such improvements in timing efficiency and optimization efficiency can enable information technology infrastructures to react in a dynamic manner to address surges, overloads, imbalances, and other incidents that may otherwise cause network devices (e.g., servers) to go down.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for quantum dynamic network server load management, the system comprising:
    a classical computer apparatus comprising:
        a processor;
        a memory; and
        a server capacity management application that is stored in the memory and executed by the processor;
    a quantum optimizer in operative communication with the classical computer apparatus, the quantum optimizer comprising:
        a quantum processor; and
        a quantum memory;
    wherein the server capacity management application of the classical computer apparatus is configured to:
        receive load management information from a plurality of information technology infrastructure devices of an overall system network environment;
        determine that at least a subset of the load management information requires quantum optimization;
        in response to determining that the subset of the load management information requires quantum optimization, format the subset of the load management information for quantum optimization;
        transmit the formatted subset of the load management information to the quantum optimizer;
        receive, from the quantum optimizer, an optimized load leveling process for distributing traffic across the information technology infrastructure devices based on the formatted subset of the load management information; and
        implement the optimized load leveling process across the information technology infrastructure devices of the overall system network environment; and
    wherein the quantum optimizer is configured to:
        receive the transmitted formatted subset of the load management information from the classical computer apparatus;
        analyze the formatted subset of the load management information to determine the optimized load leveling process for distributing traffic across the information technology infrastructure devices; and
        transmit the optimized load leveling process for distributing traffic across the information technology infrastructure devices to the classical computer apparatus.

2. The system of claim 1, wherein receiving the load management information from the plurality of information technology infrastructure devices comprises dynamically receiving the load management information in real time from each of the plurality of network servers.

3. The system of claim 1, wherein:
    the server capacity management application of the classical computer apparatus is further configured to:
        receive an indication that a change management process of the overall system network environment will go into effect within a predetermined period of time; and
    transmitting the formatted subset of load management information to the quantum optimizer is performed in response to receiving the indication that the change management process will go into effect within the predetermined period of time.

4. The system of claim 1, wherein the subset of load management information comprises data that cannot be efficiently processed by the classical computer apparatus alone, based on complexity or quantity of metrics in the load management information.

5. The system of claim 1, wherein the information technology infrastructure devices comprise a plurality of servers, network devices, storage systems, or end user devices.

6. The system of claim 1, wherein the load management information comprises server volume information, device latency information, hardware operation metrics, software operation metrics, memory levels, and physical space levels of the information technology infrastructure devices.

7. The system of claim 1, wherein the load management information comprises efficiency metrics for processed data across the information technology infrastructure devices.

8. A method for providing quantum dynamic network server load management, the method comprising:
    receiving, via a classical computer apparatus, load management information from a plurality of information technology infrastructure devices of an overall system network environment;
    determining, via the classical computer apparatus, that at least a subset of the load management information requires quantum optimization;
    in response to determining that the subset of the load management information requires quantum optimization, formatting, via the classical computer apparatus, the subset of the load management information for quantum optimization;
    transmitting, via the classical computer apparatus, the formatted subset of the load management information to the quantum optimizer;
    receiving, via a quantum optimizer, the transmitted formatted subset of the load management information from the classical computer apparatus;
    analyzing, via the quantum optimizer, the formatted subset of the load management information to determine the optimized load leveling process for distributing traffic across the information technology infrastructure devices;
    transmitting, via the quantum optimizer, the optimized load leveling process for distributing traffic across the information technology infrastructure devices to the classical computer apparatus;
    receiving, via the classical computer apparatus, from the quantum optimizer, an optimized load leveling process for distributing traffic across the information technology infrastructure devices based on the formatted subset of the load management information; and implementing, via the classical computer apparatus, the optimized load leveling process across the information technology infrastructure devices of the overall system network environment.

9. The method of claim 8, wherein the method further comprises receiving, via the classical computer apparatus, the load management information from the plurality of information technology infrastructure devices comprises dynamically receiving the load management information in real time from each of the plurality of network servers.

10. The method of claim 8, wherein:
the method further comprises receiving, via the classical computer apparatus, an indication that a change management process of the overall system network environment will go into effect within a predetermined period of time; and
transmitting, via the classical computer apparatus, the formatted subset of load management information to the quantum optimizer is performed in response to receiving the indication that the change management process will go into effect within the predetermined period of time.

11. The method of claim 8, wherein the subset of load management information comprises data that cannot be efficiently processed by the classical computer apparatus alone, based on complexity or quantity of metrics in the load management information.

12. The method of claim 8, wherein the information technology infrastructure devices comprise a plurality of servers, network devices, storage systems, or end user devices.

13. The method of claim 8, wherein the load management information comprises server volume information, device latency information, hardware operation metrics, software operation metrics, memory levels, and physical space levels of the information technology infrastructure devices.

14. The method of claim 8, wherein the load management information comprises efficiency metrics for processed data across the information technology infrastructure devices.

15. A computer program product for providing quantum dynamic network server load management, the computer program product comprising a non-transitory computer-readable medium comprising code causing a classical computer apparatus to:
receive load management information from a plurality of information technology infrastructure devices of an overall system network environment;
determine that at least a subset of the load management information requires quantum optimization;
in response to determining that the subset of the load management information requires quantum optimization, format the subset of the load management information for quantum optimization;
transmit the formatted subset of the load management information to the quantum optimizer;
receive, from the quantum optimizer, an optimized load leveling process for distributing traffic across the information technology infrastructure devices based on the formatted subset of the load management information; and
implement the optimized load leveling process across the information technology infrastructure devices of the overall system network environment; and
wherein the quantum optimizer is configured to:
receive the transmitted formatted subset of the load management information from the classical computer apparatus;
analyze the formatted subset of the load management information to determine the optimized load leveling process for distributing traffic across the information technology infrastructure devices; and
transmit the optimized load leveling process for distributing traffic across the information technology infrastructure devices to the classical computer apparatus.

16. The computer program product of claim 15, wherein receiving the load management information from the plurality of information technology infrastructure devices comprises dynamically receiving the load management information in real time from each of the plurality of network servers.

17. The computer program product of claim 15, wherein:
the computer program product is further configured to:
receive an indication that a change management process of the overall system network environment will go into effect within a predetermined period of time; and
transmitting the formatted subset of load management information to the quantum optimizer is performed in response to receiving the indication that the change management process will go into effect within the predetermined period of time.

18. The computer program product of claim 15, wherein the subset of load management information comprises data that cannot be efficiently processed by the classical computer apparatus alone, based on complexity or quantity of metrics in the load management information.

19. The computer program product of claim 15, wherein the information technology infrastructure devices comprise a plurality of servers, network devices, storage systems, or end user devices.

20. The computer program product of claim 15, wherein the load management information comprises server volume information, device latency information, hardware operation metrics, software operation metrics, memory levels, and physical space levels of the information technology infrastructure devices.

* * * * *